(12) United States Patent
Wyler

(10) Patent No.: US 9,668,190 B2
(45) Date of Patent: *May 30, 2017

(54) SYSTEM AND METHOD FOR DUAL MODE COMMUNICATION

(71) Applicant: Gregory Thane Wyler, Sewalls Point, FL (US)

(72) Inventor: Gregory Thane Wyler, Sewalls Point, FL (US)

(73) Assignee: WorldVu Satellites Limited, St Helier (JE)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,323

(22) Filed: Aug. 27, 2014

(65) Prior Publication Data
US 2014/0370887 A1 Dec. 18, 2014

Related U.S. Application Data

(63) Continuation of application No. 13/353,472, filed on Jan. 19, 2012, now Pat. No. 8,849,274.

(51) Int. Cl.
*H04W 36/30* (2009.01)
*H04W 36/18* (2009.01)
*H04W 36/14* (2009.01)
*H04W 88/06* (2009.01)

(52) U.S. Cl.
CPC ........... *H04W 36/30* (2013.01); *H04W 36/14* (2013.01); *H04W 36/18* (2013.01); *H04W 88/06* (2013.01)

(58) Field of Classification Search
CPC ..... H04W 36/14; H04W 36/18; H04W 36/30; H04W 88/06

USPC ......................................................... 455/427
See application file for complete search history.

(56) References Cited

U.S. PATENT DOCUMENTS

| | | | |
|---|---|---|---|
| 6,157,834 A * | 12/2000 | Helm | H04W 36/0066 455/12.1 |
| 6,272,315 B1 | 8/2001 | Chang et al. | |
| 6,614,769 B1 * | 9/2003 | Erlick | H04W 36/30 370/331 |
| 8,611,813 B1 * | 12/2013 | Harvey | H04B 7/15507 370/274 |
| 2007/0123252 A1 | 5/2007 | Tronc et al. | |
| 2007/0206522 A1 | 9/2007 | Starke et al. | |
| 2009/0154421 A1 | 6/2009 | Hong et al. | |
| 2010/0190533 A1 | 7/2010 | Black et al. | |
| 2012/0281741 A1 | 11/2012 | Feher | |

FOREIGN PATENT DOCUMENTS

JP           H06318902 A      11/1994

* cited by examiner

*Primary Examiner* — Nathan Taylor
(74) *Attorney, Agent, or Firm* — Kaplan Breyer Schwarz, LLP

(57) ABSTRACT

A system and method of communication disclosed which may include establishing a telephone call for a cell phone at a first end of the call to a second end of the call, the cell phone receiving communication service from a cellular phone network; substantially continuously detecting a signal level of the cellular phone network available to the cell phone; and transferring the telephone call from the cellular phone service to a second network having a link back to a core network of said cellular phone network only if the detected signal level of the cellular phone service falls below a specified threshold.

16 Claims, 3 Drawing Sheets

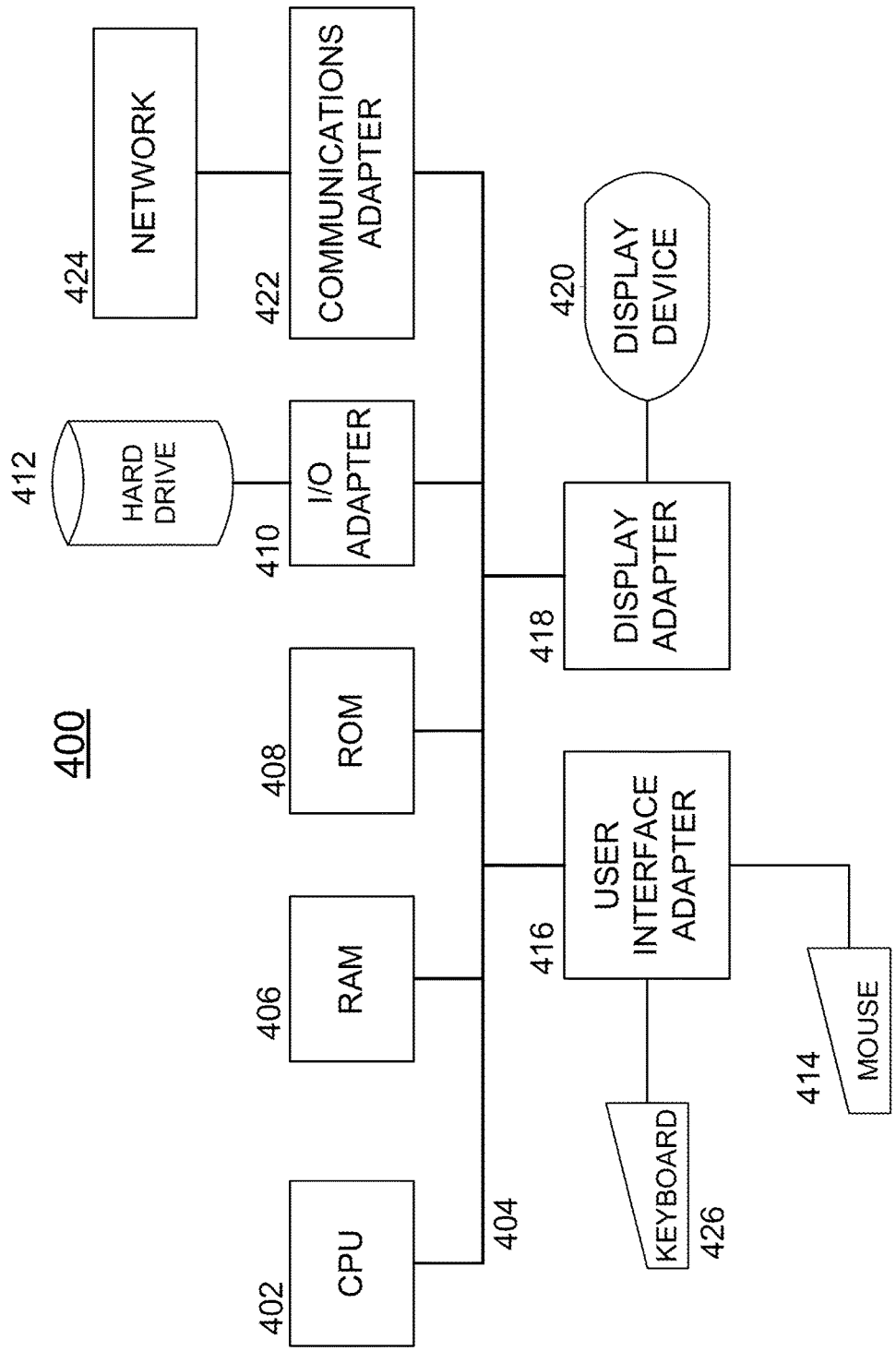

SYSTEM AND METHOD FOR DUAL MODE COMMUNICATION

CROSS-REFERENCE TO RELATED APPLICATIONS

This is a continuation of U.S. patent application Ser. No. 13/353,472, filed Jan. 19, 2012, which is incorporated herein by reference.

BACKGROUND OF THE INVENTION

Support for cell phones and other devices using cellular telephone network technology may vary substantially due to variation in the strength of the signal at a given location at given moment in time. The variation is due to several factors including the distribution of cellular service towers compatible with a particular cell phone's communication protocol and brand name, the topography of the area the cell is located in, the level data traffic at the local cell phone tower and/or within the cellular phone system the tower works within, among other factors. Very low signal strength may lead to unintelligible conversations, dropped calls, failed data transmissions among other undesirable events.

Alternative communication techniques may be deployed as a backup in the event of the unavailability of cell phone service. However, discontinuing the use of a cell phone, and starting to use separate equipment, such as satellite telephone equipment, takes a substantial amount of time, can be highly inconvenient, and leads to considerable discontinuity in personal conversation and/or in data transmission which is undesirable.

Accordingly, there is a need in the art for improved systems and methods for ensuring continuity of communication sessions for mobile devices.

SUMMARY OF THE INVENTION

According to one aspect, the present invention is directed to a method of communication which may include establishing a telephone call for a cell phone at a first end of the call to a second end of the call, the cell phone receiving communication service from a cellular phone network; substantially continuously detecting a signal level of the cellular phone network available to the cell phone; and transferring the telephone call from the cellular phone service to a second network having a link back to a core network of said cellular phone network only if the detected signal level of the cellular phone service falls below a specified threshold.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a block diagram of a computer system useable in conjunction with one or more embodiments of the present invention.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
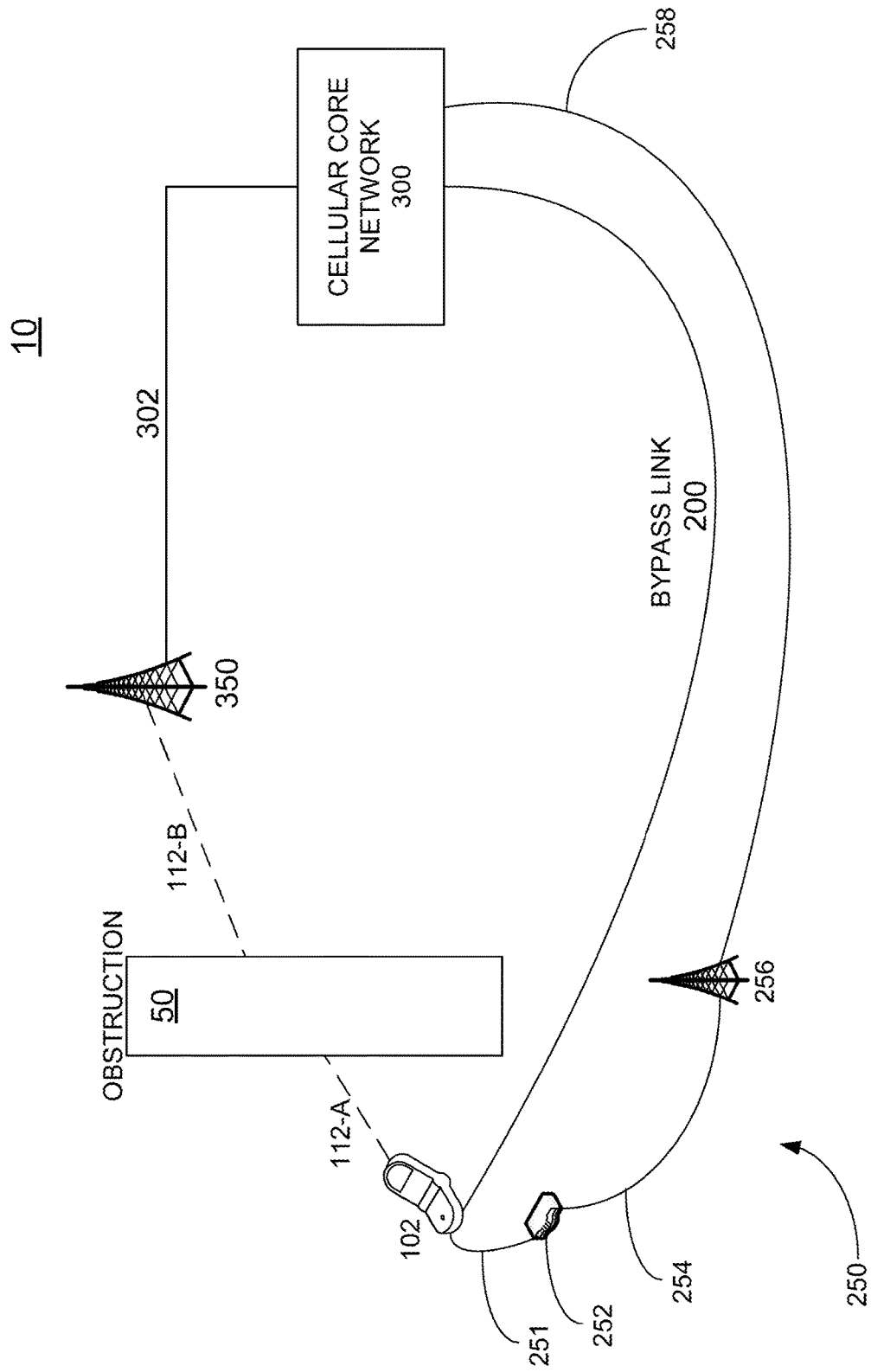
FIG. 1 is a block diagram of a system for providing multiple communication paths between a portable communication device and a communication network in accordance with an embodiment of the present invention.

FIG. 1 is a block diagram of a system 10 for providing multiple communication paths between a portable communication device 102 and a communication network 300 in accordance with an embodiment of the present invention.

FIG. 1 shows system 10 including cellular core network 300, cell tower 350, communication link 302 between core network 300 and cell tower 350, cell phone 102 and disjointed communication paths 112-A and 112-B between cell phone 102 and cell tower 350, which are blocked by obstruction 50. System 10 may also include bypass link 250 which may include communication link 251, multiple-mode communication device 252, link 254, which preferably leads to cell tower 256.

Obstruction 50 may be anything that diminishes the strength of the signal from cell tower 350 as received by cell phone 102 to the extent where cell phone 102 is unable to properly communicate with tower 350. For instance, obstruction 50 may be a building, tunnel, bridge, mountain, or even free air loss due to distance. In some cases, obstruction 50 may be temporary environmental condition such as a rain storm, or electromagnetic interference. At a more conceptual level, obstruction 50 could be anything that inhibits normal operation of a properly functioning communication link 112 between cell phone 102 and tower 350 including high demand for the available bandwidth of tower 350, a malfunction of tower 350 or a portion of core network 350.

Bypass link 200 may be any communication mechanism for bypassing the standard communication path between cell phone 102 and core network 300. Bypass link 200 may include the use of one or more technologies that may be used in the alternative or in combination. In one embodiment discussed herein, bypass link 200 may include at least one satellite communication link. However, the present invention is not limited to the use of satellite communication links.

In another embodiment, the bypass link need not extend all the way from cell phone 102 to core network 300. Instead, the bypass link may be configured to re-connect with the cellular communication network (which may include cellular core network 300 and all cell towers in communication with cellular core network 300) at a selected cell tower within the cellular communication network. Thus, bypass link 250 may enable cell phone 102 to connect to cell tower 256 by means other than a standard 3G or 3G cell phone communication link. Cell tower 256 would preferably be equipped with whatever type of communication port is needed to send and receive data over link 254.

For the above-discussed tunnel communication scenario to work, device 252 may conduct 3G or 4G communication with cell phone 102 and wired communication with tower 256. Using a wired connection for communication link 251 is merely one possible way of bypassing the obstacle to standard 3G communication imposed by the tunnel walls. However, the invention is not limited to employing a wired connection. Other connection technologies may be used for this purpose.

In the following, a more specific embodiment of the above concept is discussed in connection with FIG. 2.

Figure 2:
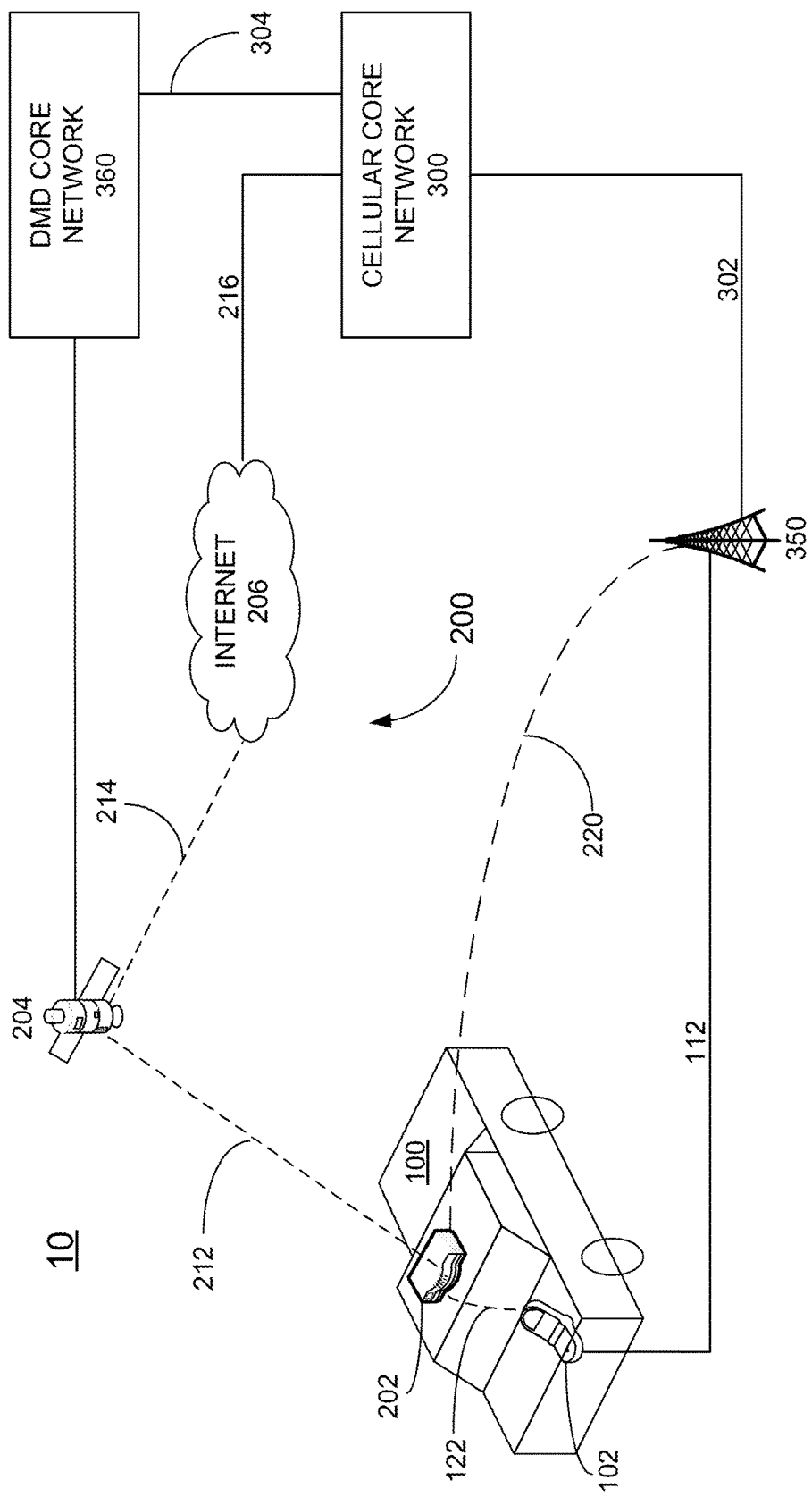
FIG. 2 is a block diagram of a system for providing multiple communication paths between a cell phone within a vehicle and a core network servicing the cell phone in accordance with an embodiment of the present invention.

FIG. 2 is a block diagram of a system 10 for providing multiple communication paths between a cell phone 102 within a vehicle 100 and a core network 300 servicing the cell phone, in accordance with an embodiment of the present invention. The embodiment of FIG. 2 may include vehicle 100, cell phone 102 (or other mobile-communication-enabled device such as a laptop computer, tablet computer etc.), dual mode device (DMD) 202, satellite 204, internet 206, core network 350 and communication links 122, 212, 214, 216, 220, 112, and 302. Aspects of the various communication links will be discussed as the links arise in the discussion below of the operation of the system of FIG. 10.

Prior to discussing the operation of system 10, we direct attention to dual-mode device 202. In this embodiment, dual-mode device 202 (DMD) may bridge two wireless communication links: the cellular link 122 from cell phone 102 and a satellite communication link 212 to satellite 204. Dual-mode device 202 therefore preferably includes at least a first communication port operable to send/receive data (which may include voice data) over 3G or 4G (or other mobile-phone type communication link) to/from cell phone 102 (or other mobile-communication-enabled device) and a second communication port operable to send/receive data to/from satellite 204 and/or other satellites within a satellite communication system. DMD 202 preferably also includes data-communication conversion circuitry for performing any needed conversions of data formatting, communication protocols and the like for transferring data received on 3G link 122 into a form suitable for transmitting out of satellite communication link 212, and for performing the reverse conversion for data arriving from link 212 for transmission out of link 122.

Furthermore, DMD 202 may include the ability to determine the strength of the cellular signal from the nearest cellular towers and a processing engine to determine when it is optimal to increase its own signal strength to enable the cellular phone to switch over to the DMD 202 for reception. In another embodiment, the DMD may receive instructions from either DMD core network 360 or cellular core network 300 to increase the DMD 202 signal strength so as to enable the cellular phone(s) 102 hand over data traffic to the DMD 202, and thereby obtain good reception even if the local cellular service is weak. In another embodiment, the DMD 202 may include a GPS link and either internally, or based upon commands from the DMD core network 360, control the DMD 202 signal strength as a function of the location indicated by the GPS link. Thus, for example, where the local cellular signal strength is weak, DMD core network 360 may instruct DMD 202 to increase its signal strength in a manner perceptible to cell phone 102, so as to prompt cell phone 102 to switch its communication link from cellular link 112 to link 122 to DMD 202.

DMD 202 is not limited to the above-described configuration. In other embodiments, DMD 202 may include more than two communication ports and/or may be capable of accommodating more than two types of communication links. Moreover, DMD 202 may be operable to communicate over links having communication protocols other than the 3G or 4G cell phone type link 122 and the satellite link 212. Further, DMD 202 is not limited to communicating over wireless links In embodiments in which DMD 202 is situated in a stationary environment, DMD 202 may be enabled to service one or more wired communication links, optical links, in addition to, or alternatively to servicing multiple types of wireless radio-frequency communication links.

In one embodiment, the DMD 202 may placed on or in a vehicle 100, as shown in FIG. 2. If vehicle 100 enters an area with poor cell phone service coverage, the cell phone 102 may be operable to switch from using the usual cell tower 350 service over mobile link (i.e. 3G link or other mobile protocol) 112 to using DMD 202 and its sequence of connections along bypass path 200 to maintain the continuity of a telephone call that is already under way. We refer to this alternative sequence of connections that may be configured to continue and/or establish a telephone call as bypass path 200. Cell phone 102 may use communication link 122 to request that DMD 202 complete a communication connection back to core network 300 using bypass communication path 200.

In the embodiment of FIG. 2, bypass path 200 extends from cell phone 102 to core network 300 and preferably includes the following links and devices, in order their occurrence along bypass path 200 from cell phone 102 to core network 300. Specifically, bypass path 200 extends from cell phone 102 to communication link 122 (which may be a 3G or 4G link) to DMD 202, to satellite communication link 212, to satellite 204, to satellite-to-ground communication link 214, to internet 206 (the connections through which are preferably, but not necessarily, terrestrial), on to link 216 (which may be a conventional wired, broadband communication link) to cellular core network 300. The above describes one possible bypass path 200 to serve as alternative to the traditional path along link 112, tower 350, and link 302 from cell phone 102 to core network 300. However, the present invention is not limited to the specifics of bypass path 200. Other possible bypass paths, using other communication technologies, in addition to, or as an alternative to, those shown in bypass path 200 in FIG. 2, may be implemented.

In this embodiment, DMD 202 preferably communicates with satellite 204 over satellite communication link 212. Satellite 204, in turn, then preferably conducts communication with the internet 206 over link 214, where link 214 may include a backhaul link down to a satellite-dish-equipped ground station which is connected to the internet 206. Finally, internet 206 may connect to core network 300 over link 216. Once the call has been transferred to the control of DMD 202, the call may continue to be serviced by DMD 202 until cell phone 102 detects a sufficiently strong signal from tower 350, at which point cell phone 102 may switch the call connection from DMD 202 back to link 112 to cell tower 350.

In the embodiment illustrated in FIG. 2, bypass path 200 extends from cell phone 102 all the way to core network 300. However, in alternative embodiments, bypass paths may be implemented that reconnect with the cellular communications network without extending all the way to core network 300. Instead, a bypass path could reconnect with the cellular communications network by establishing communication with the closest cell tower to the location of cell phone 102 that is operational and that communication devices along the bypass path 200 can establish a communication link with.

A concept similar to this was discussed in connection with FIG. 1 where communication link 254 extended through a physical obstacle that obstructed standard 3G cell phone communication. However, communication link 254, instead of extending all the way to core network 300, reconnects with the cellular communication network at a cell tower 256 that is nearest to an exterior of the item obstructing the 3G communication link.

Similarly, in the embodiment of FIG. 2, satellite 204 and/or devices within a portion of internet 206 may communicate with a selected cell tower within the cellular communication network controlled by core network 300, instead extending all the way to core network 300. The selected cell tower (not shown) may be configured to able to handle two modes of communication: (1) the usual 3G and/or 4G communication; and (2) whatever the bypass communication protocol/method is. For instance, in the embodiment of FIG. 2, cell tower 350 could be placed in communication with a satellite system ground station capable of communication with satellite 204.

In another embodiment, DMD 202 may detect, over link 220, the strength of the signal from cell tower 350 and/or signals from one or more other cell towers as vehicle 100 travels along its trajectory. If DMD 202 determines that the signal from the nearest cell tower has fallen below an acceptable threshold, DMD 202 may notify cell phone 102 over link 122 of a need to allow DMD 202 to take over any ongoing communication being conducted by cell phone 102. Cell phone 102 may then respond to this notification by transferring telephone call servicing to DMD 202 and bypass 200 until the available cellular phone service improves.

In an embodiment, DMD 202 may detect the signal strength of a local cell tower, such as cell tower 350. However, DMD 202 may diminish the strength of its own signal that can be detected by cell phone 102, preferably over link 122. The reduction in strength of the DMD 202 signal tends to work against cell phone 102 switching its telephone call service from cell tower 350 to DMD 202. If DMD 202 determines that the reduction in signal strength from tower 350 (or other comparable cell tower) has diminished below an acceptable threshold, DMD 202 may increase the strength of its own outgoing signal, over link 122, to thereby cause cell phone 102 to determine that the DMD 202 signal is stronger than the signal from cell tower 350, and thereby prompt cell phone 102 to shift an ongoing telephone call (or other communication session) to DMD 202.

In another embodiment, a core network 360 for the provider of the DMD 202 services, using satellite 204, may be in communication with the cellular system core network 300, over communication link 304 and may receive information about parameters of the local cell tower (such as tower 350) operations. If, for example, a cell tower is congested, a disclosure of the congestion condition may be transmitted to the DMD 202 core network 360 so that the DMD 202 may take over communication to and from cell phone 102, to thereby avoid overloading local cell tower 350, or other similar cell tower.

FIG. 3 is a block diagram of a computing system 400 adaptable for use with one or more embodiments of the present invention. Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs. I/O adapter 410 may connect storage devices, such as hard drive 412, a CD-ROM (not shown), or other mass storage device to computing system 400. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of communication, the method comprising:
substantially continuously detecting, by a dual-mode device (DMD), a signal level of a cell tower of the cellular phone network available to a cell phone that has established a telephone call at a first end of the call to a second end of the call through the cellular phone network, the cell phone communicating over the air directly between the cell phone and the cell tower; and
if the detected signal level of the cellular phone network falls below a specified threshold, presenting a cellular transceiver in the DMD to the cell phone as a cell tower in communication with a satellite of a second network to enable the cell phone to hand over the established telephone call to the DMD to provide an uninterrupted service.

2. The method of claim 1, further comprising transferring, by the DMD, the established telephone call from the cellular phone network to the satellite of the second network, the second network having a link back to a core network of said cellular phone network to provide an uninterrupted service.

3. The method of claim 2 wherein the DMD is located within a vehicle, the DMD having a first communication link to the cell phone and a second communication link to the second network and wherein the transferring step comprises:
the DMD connecting the established cell phone call to the second network.

4. The method of claim 2, wherein:
the detecting step includes the DMD detecting the signal level of the cellular phone network; and
the transferring step includes the DMD increasing its transmission power and notifying the cell phone of a need to transfer operation of the established telephone call to the second network.

5. The method of claim 2, wherein the transferring step further includes the cell phone directing the DMD to transfer operation of the established telephone call to the second network.

6. The method of claim 2, wherein:
the detecting step the DMD detecting the signal level of the cellular phone network; and
the transferring step includes:
the DMD reporting the low signal strength to one of (a) a core network of the DMD, and (b) the cellular phone core network; and
one of (a) the DMD core network and (b) the cellular phone core network requesting the DMD to increase its signal strength to an acceptable level and the network commanding the cell phone to switch to the DMD.

7. The method of claim 6, further comprising transferring, by the DMD, the established telephone call from the cellular phone network to a satellite of a second network having a link back to a core network of said cellular phone network to provide an uninterrupted service, wherein the transferring step further includes the DMD increasing an indication of the signal strength of the second network to the cell phone, to prompt the cell phone to transfer the call to the second network, only if the DMD determines that the signal level of the cellular phone network has fallen below the acceptable threshold.

8. The method of claim 2, further comprising:
said cellular phone core network monitoring a congestion level of a cell tower servicing said telephone call for said cell phone;
said cellular phone core network notifying a core network of said DMD if the congestion level of said cell tower exceeds an acceptable threshold; and
a DMD core network instructing said DMD on said vehicle to prompt the cell phone to transfer the telephone call to said second network if the congestion level of said cell tower exceeds said acceptable threshold.

9. A dual-mode device (DMD) comprising:
a cell phone port that communicates with a cell phone communication link;
a satellite port that communicates with a satellite communication network;
a processing engine that (a) continuously detects a signal level of service from a cell tower of a cellular phone network to said cell phone over the cell phone port, wherein the cell phone communicates over the air directly between the cell phone and the cell tower, (b) if the detected signal level falls below a specified threshold, present the DMD to the cell phone as a cell tower through the cell phone port to enable the cell phone to hand over the established telephone call to the DMD, and (c) transfers a telephone call in progress on said cell phone from the cellular phone network to said satellite communication network through the satellite port to provide an uninterrupted service.

10. The DMD of claim 9, wherein the DMD is incorporated on or within a motor vehicle.

11. The DMD of claim 9, wherein the cell phone port comprises a 3G communication port.

12. The DMD of claim 11 wherein the DMD comprises:
a conversion circuit for enabling data received at the 3G port of said DMD to be configured to flow out the satellite communication port of the DMD and for enabling data received at the satellite communication port of the DMD to be transmitted to and out of the cell phone communication port of the DMD.

13. The DMD of claim 9 wherein the DMD is incorporated within said cell phone.

14. A method for a cell phone to communicate using a land-based cellular phone network and a satellite when the land-based cellular phone network is about to become unavailable to the cell phone, the method comprising:
continuously detecting, by a processing engine of a dual-mode device (DMD), a signal level of a cell tower of a land-based cellular phone network available to a cell phone that has established a telephone call through the cellular phone network, the cell phone communicating over the air directly between the cell phone and the cell tower, the DMD including a cellular transceiver for communicating with the cell phone through a wireless cellular link and a satellite transceiver for communicating with a satellite through a satellite link; and
if the detected signal level of the cellular phone network falls below a specified threshold, presenting the cellular transceiver in the DMD to the cell phone as a cell tower in communication with the satellite to enable the cell phone to hand over the established telephone call to the DMD to maintain a continuity of the established telephone call.

15. The method of claim 14, further comprising transferring, by the DMD, the established telephone call from the cellular phone network to the satellite having a link back to the cellular phone network.

16. The method of claim 14, wherein the step of presenting the cellular transceiver in the DMD to the cell phone as a cell tower includes increasing the power of a wireless signal between the cell phone and the cellular transceiver in the DMD to encourage the cell phone to switch the established telephone call to the DMD.

* * * * *